June 1, 1937.  H. R. GIBBONS  2,082,390
ANTIFRICTION BEARING
Filed July 12, 1934   2 Sheets-Sheet 1

INVENTOR:
HAROLD R. GIBBONS,
BY
HIS ATTORNEY.

June 1, 1937.  H. R. GIBBONS  2,082,390
ANTIFRICTION BEARING
Filed July 12, 1934  2 Sheets-Sheet 2
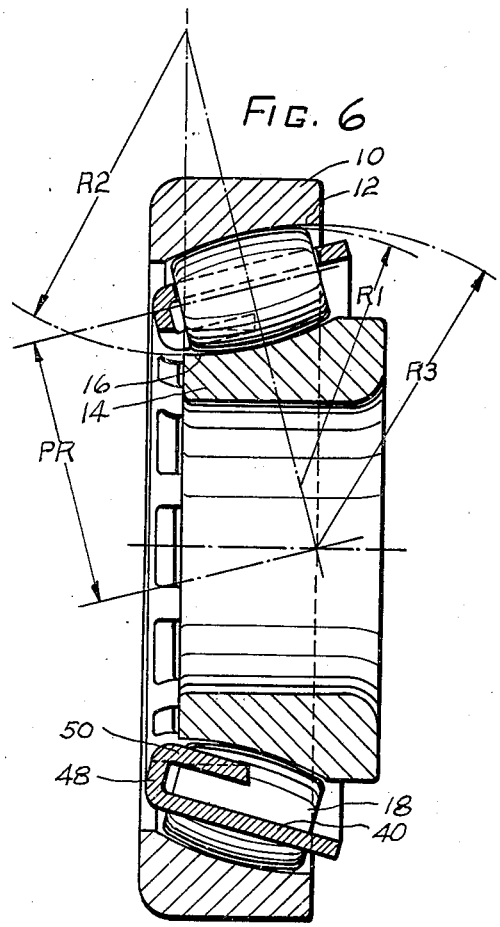
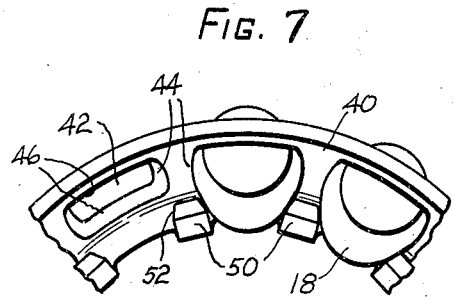
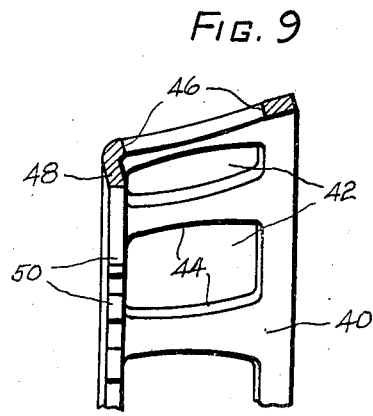
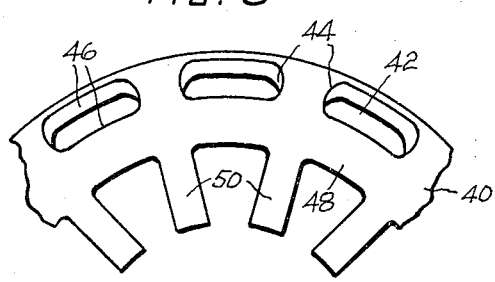
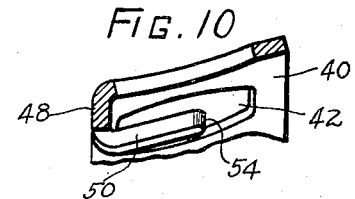
INVENTOR:
HAROLD R. GIBBONS,
BY
HIS ATTORNEY.

Patented June 1, 1937

2,082,390

UNITED STATES PATENT OFFICE 2,082,390

ANTIFRICTION BEARING

Harold R. Gibbons, Chatham, N. J., assignor to General Motors Corporation, Detroit, Mich., a corporation of Delaware Application July 12, 1934, Serial No. 734,795

12 Claims. (Cl. 308—214)

This invention relates to antifriction bearings and comprises all of the features and aspects of novelty herein disclosed. An object of the invention is to provide an antifriction bearing wherein load contact areas and unit pressures are equalized on inner and outer race rings. Another object is to provide an improved roller bearing of the angular-contact, self-aligning type. Another object is to provide an improved roller cage. To these ends and also to improve generally upon devices of this character, the invention consists in the various matters hereinafter described and claimed.

In its broader aspects, the invention is not necessarily limited to the specific constructions selected for illustrative purposes in the accompanying drawings in which Fig. 1 is a diagram.

Fig. 6 is a transverse sectional view of an angular contact roller bearing having a roller cage.

Fig. 7 is a side elevation of a portion of the completed cage.

Fig. 8 is a side elevation of a portion of the cage prior to bending the retaining fingers and Fig. 9 is a cross sectional view of Fig. 8.

Fig. 10 is a cross sectional view of a preferred modification.

When an antifriction bearing is a ball bearing or otherwise has the rollers and races curved transversely of the bearing, that is, in an axial plane, the application of load compresses the rollers and gives contact areas that are substantially elliptical on both races. The major axis of each contact ellipse is proportional to the relative curvature between the roller and the race in an axial plane through the roller axis and increases to a maximum as differences in curvature approach zero. The minor axis of each ellipse is proportional to the relative curvature between the roller and the race in a plane perpendicular to the axial plane and to the axis of the roller and is controlled by bearing diameter and roller diameter proportions.

The width of the inner race ellipse is less than that of the outer race ellipse due to the greater relative curvature between the inner race and the roller, circumferentially of the bearing. If the ellipses have the same length but one is narrower, the areas are unequal and the stress per unit of area is less on one than on the other. Better operating conditions can be obtained if the roller has the same contact area and same unit stress against both races. To get this very desirable result, it is proposed to increase the length of the contact ellipse on the inner race, thus to make the area as large as that of the outer race ellipse. This is accomplished by making the radius of transverse curvature of the inner race of a certain length which in the case of convex rollers, is less than the radius of transverse curvature of the outer race but greater than the radius of transverse curvature of the roller. When the rolling elements are concave, the radius of transverse curvature of the inner race is made greater than the radius of transverse curvature of the outer race and less than the radius of transverse curvature of the roller. In both cases, the inner race curvature transversely has a value which lies between that of the outer race and rollers. Otherwise stated, the same contact areas and the same pressures per unit of area are obtained when the relative curvature transversely (between roller and outer race) to the relative curvature transversely (between roller and inner race) varies inversely as the relative curvature circumferentially (between roller and outer race) to the relative curvature circumferentially (between roller and inner race). Another way of stating this is that the ratio of relative transverse curvatures, between outer race and roller, and between inner race and roller, is equal to the ratio of the radii, circumferentially, of outer race and inner race.

Figure 1:
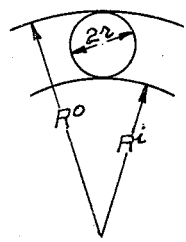

To make the above matters more apparent diagrammatically, consider Fig. 1 wherein $R^o$ indicates the radius of curvature of an outer race, $R^i$ the radius of curvature of an inner race, and $2r$ the diameter of a roller between the races, all such curvatures being circumferentially as if a bearing were in side elevation.

The curvature of the inner race is $$\frac{1}{R^i}$$

The curvature of the outer race is $$\frac{1}{R^o}$$

The curvature of the roller is $$\frac{1}{r}$$

The relative curvature between the inner race and the roller is $$\frac{1}{r} + \frac{1}{R^i} = \frac{R^i + r}{rR^i} \qquad (1)$$

The relative curvature between the outer race and the roller is $$\frac{1}{r} - \frac{1}{R^o} = \frac{R^o - r}{rR^o} \qquad (2)$$

Now $R^o = R^i + 2r$ and substituting this value of $R^o$ at the right of Equation No. 2 above we get $$\frac{(R^i + 2r) - r}{r(R^i + 2r)} = \frac{R^i + r}{r(R^i + 2r)} \qquad (2a)$$

Therefore the ratio of relative curvatures is expressed by Equation (1) over Equation (2) or its equal (2a)

$$\frac{\frac{R^i + r}{rR^i}}{\frac{R^i + r}{r(R^i + 2r)}} = \frac{\frac{R^i + r}{r}\left(\frac{1}{R^i}\right)}{\frac{R^i + r}{r}\left(\frac{1}{R^i + 2r}\right)} = \frac{\frac{1}{R^i}}{\frac{1}{R^i + 2r}} = \frac{\frac{1}{R^i}}{\frac{1}{R^o}}$$

thus showing that the ratio of relative curvatures circumferentially (between inner race and roller) and (between outer race and roller) is equal to the ratio of inner race curvature and outer race curvature.

Now if the rollers have the same relative transverse curvature at both races, the outer race ellipse will naturally be wider than the inner race ellipse and its unit pressure less under load. Therefore, to compensate and equalize the areas and unit pressures on the two races, the present invention makes the transverse curvature different at the two races, as by making the inner race more closely conform to the rollers.

See Figs. 2 to 6 wherein
PR = pitch radius of the roller series,
R3 = outer race transverse radius,
R2 = inner race transverse radius,
R1 = roller transverse radius, and let R2 be larger than R1 but smaller than R3, in the case of convex rollers. Then $$\frac{1}{R1} - \frac{1}{R3}$$

represents the relative transverse curvature between the outer race and the roller.

$$\frac{1}{R1} - \frac{1}{R2}$$

represents the relative transverse curvature between the inner race and the roller. The ratio of the two curvature differences should be such as to compensate for the differences in circumferential curvature between outer and inner race as expressed by the ratio $$\frac{\frac{1}{R^i}}{\frac{1}{R^o}}$$

above mentioned and since unit pressure varies with the product of relative curvatures transversely and circumferentially we get $$\left(\frac{1}{R1} - \frac{1}{R3}\right)\frac{1}{R^o} = \left(\frac{1}{R1} - \frac{1}{R2}\right)\frac{1}{R^i}$$

or $$\frac{\frac{1}{R1} - \frac{1}{R3}}{\frac{1}{R1} - \frac{1}{R2}} = \frac{\frac{1}{R^i}}{\frac{1}{R^o}}$$

That is, the ratio of relative curvatures (between outer race and roller and between inner race and roller) taken transversely of the bearing is inversely proportional to the ratio of relative curvatures taken circumferentially. Now $$\frac{\frac{1}{R^i}}{\frac{1}{R^o}} = \frac{R^o}{R^i} = \frac{PR + r}{PR - r}$$

Hence $$\frac{\frac{1}{R1} - \frac{1}{R3}}{\frac{1}{R1} - \frac{1}{R2}} = \frac{PR + r}{PR - r}$$

This formula, then, determines how to get the desired equality in elliptical areas and in unit contact pressures. This equality in contact pressures is a distinct advantage since the rolling action of the rollers is accompanied by a slight roller slippage and the balanced pressure condition permits the rollers to roll more easily in their proper paths. Since the load that a roller will support varies as the area of the contact ellipse, it is desirable to have the ellipse of maximum practical length but, as the length increases, slippage increases and therefore the most desirable length has a practical limit. It has been found that approximately 1% difference between the outer race transverse radius R3 and the roller transverse radius R1 is satisfactory. The nature and extent of contact will vary from a point under no load to an ellipse approaching full length of the roller under normal load and, if there is overload, the ellipse may then extend the full length of the roller and provide a factor of safety.

The invention has the advantage that it is applicable to a variety of bearings, as shown in Figs. 2, 3, 4, 5 and 6, and especially to bearings of the self-aligning type, although it is not so limited. In the figures, the difference between R1 and the race radii R3 and R2 is exaggerated to aid in illustration. The outer race diameter and radius of curvature R3 are first established depending on the selected bearing size. Then the roller diameter, $2r$, is selected. The pitch radius PR follows directly from the preceding by subtracting $r$ from R3. The radius of transverse curvature R1 of the rollers is made somewhat less than the radius of curvature R3 of the outer race (1% less being satisfactory but subject to some variation depending on conditions of use, material, etc.). The transverse radius of the inner race then works out from the formula as closer to the transverse radius of the roller than is the outer race radius by a definite amount and is such as to give the desired substantial equality in contact pressures and areas.

Figure 2:
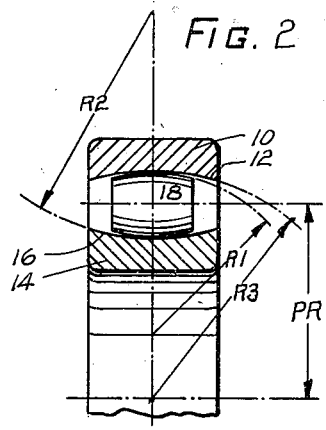
Figs. 2, 3, 4 and 5 are transverse sectional views of antifriction bearings embodying the invention.

Fig. 2 indicates the invention applied to a barrel roller bearing, part 10 being the outer race ring whose raceway 12 is preferably the zone of a sphere with radius R3, struck from the axis of the bearing to make the bearing self-aligning. An inner race ring 14 has its raceway 16 generated by an arc of radius R2 which is slightly smaller than R3 in order to conform more closely to barrel-shaped rollers 18 whose transverse curvature is determined by a radius R1, which is smaller than the other radii. In this instance, all of the centers of curvature are located in a plane through the center of the bearing. The length of the radii is determined as above described.

Figure 3:
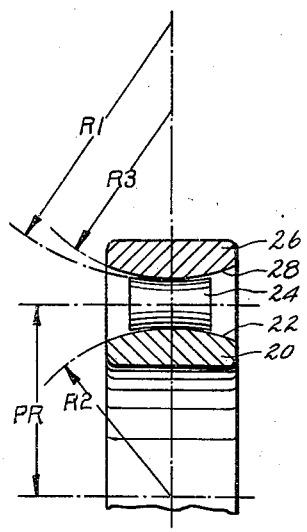

In Fig. 3, the inner race ring 20 has a raceway 22 which is preferably the zone of a sphere with radius R2 and the rollers 24 are concave or waisted. The outer race ring 26 has a transversely convex raceway 28 with a transverse radius R3 whose center is outside of the bearing. The transverse radius R1 of the rollers, in this instance, is greater than the radius R2, and the latter is greater than the radius R3 but, as in the case of barrel rollers, the inner race curvature has a value between the other two and so conforms more nearly to the rollers than does the outer race curvature.

Figure 4:
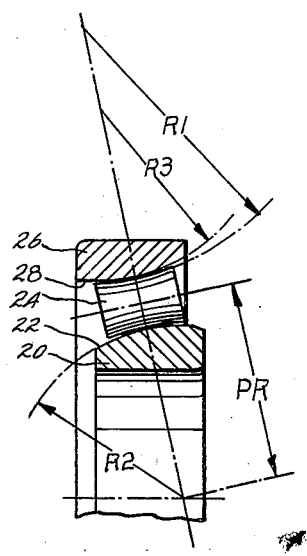

In Fig. 4, the construction resembles that of Fig. 3, the chief difference being that the bearing is of angular contact type, this result being produced by placing the centers of transverse curvature at the sides of the geometric center.

Figure 5:
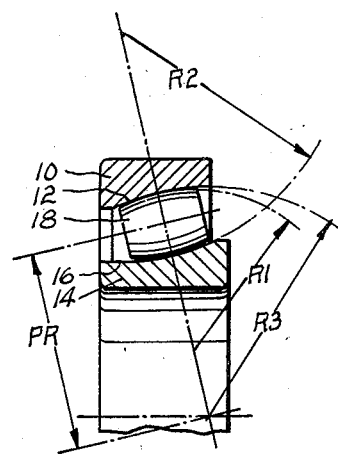

In Fig. 5, the construction resembles that of Fig. 2, the chief difference being that the bearing is of the angular contact type with the centers of curvature not in the geometric center of the bearing.

Fig. 6 resembles Fig. 5 but has a shorter inner race ring and a roller cage. The radius R2 has its center in the plane of the end face of the inner race ring. The radius R3 has its center in the plane of the end face of the outer race ring. An advantage is that two inner race rings or two outer race rings can be abutted together in a chuck and ground at one set up on an oscillating grinding machine.

In all of these forms, the centers of all three curves are desirably in the same line, this line also being normal to the axis of the roller at the center thereof, but this is not essential.

The roller cage comprises a flaring body portion 40 having openings 42 for the rollers, the openings being slightly longer than the rollers and having their front and rear edges 44 curved to fit the rollers. These edges lie in a circle outside of the roller pitch circle so that the rollers are held from outward escape radially in the absence of the outer race ring. The roller openings have straight end walls 46 to hold the rollers endwise. The cage also has, at its smaller end, a flange 48 extending inwardly approximately normal to the body portion and hence parallel to the flat ends of the rollers. This flange carries a series of retaining tongues or fingers 50 which are initially in line with the flange, as shown in Figs. 8 and 9. They are subsequently bent laterally at an angle of about 50° to the flange while the rollers are assembled, and are finally bent to make an angle of 90° with the flange so that they are parallel to the body portion and hold the rollers in the openings. The fingers terminate at points about half way of the length of the rollers or near their points of maximum diameter which is sufficient to hold the rollers in the openings. The front and rear edges 52 of the fingers are coined somewhat when forced against the rollers thereby increasing the clearance of the fingers with the inner race ring. The fingers are inside of the roller pitch circle and so will hold the rollers in the openings in the absence of the inner race ring.

In Fig. 10, the cage flange 48 is normal to the cage axis and the fingers 50 are bent at a point farther from the rollers to better clear the corners thereof. The ends of the fingers are curved as indicated at 54.

I claim:

1. In an antifriction bearing, an inner race ring and an outer race ring, each ring having a raceway curved transversely of the bearing, transversely curved elongated rollers engaging the raceways, the transverse curvature of the inner raceway having a value between that of the outer raceway and of the rollers; substantially as described.

2. A roller bearing having raceways and rollers that are curved in an axial plane, the difference in curvature of the outer raceway and rollers being greater than the difference in curvature of the inner raceway and rollers, all taken in the axial plane, the ratio of the differences being the same as the pitch diameter of the rollers plus one roller diameter is to the pitch diameter of the rollers minus one roller diameter; substantially as described.

3. A roller bearing according to claim 2 in which the first stated difference in curvature is approximately one percent.

4. In an antifriction bearing, an inner race ring and an outer race ring, each ring having a transversely curved raceway, transversely curved rolling elements between the raceways, the ratio of relative transverse curvatures, between outer raceway and rolling elements, and between inner raceway and rolling elements, being equal to the ratio of the radii, circumferentially of the bearing, of the outer raceway and the inner raceway; substantially as described.

5. An antifriction bearing according to claim 4 in which the difference in curvature between outer raceway and rolling elements is approximately one percent.

6. In an antifriction bearing, an inner race ring and an outer race ring, each ring having transversely curved raceways, transversely curved rolling elements between the raceways, the relative curvature, transversely of the bearing, between rolling elements and outer raceway, to the relative curvature, between rolling elements and inner raceway, varying inversely as the relative curvature, circumferentially of the bearing, between rolling elements and outer raceway, to the relative curvature between rolling elements and inner raceway; substantially as described.

7. Raceway-roller construction characterized by the relations indicated in the following formula wherein R1, R2, and R3 represent radii, transversely of the bearing, of roller, inner race, and outer race, respectively, PR being the pitch radius of the roller series and r the radius of a roller crosswise of its axis:

$$\frac{\frac{1}{R1}-\frac{1}{R3}}{\frac{1}{R1}-\frac{1}{R2}}=\frac{PR+r}{PR-r}$$

8. Raceway-roller construction according to claim 7 and wherein the difference between R3 and R1 is about one percent.

9. In an antifriction bearing, inner and outer race members and elongated rolling elements therebetween, all of said parts being curved transversely of the bearing without interruption or change in curvature as they proceed across the bearing, the centers of curvature all being in a common line, and the inner race curvature having a radius more closely approaching the radius of transverse curvature of the rolling elements than does the radius of the outer race curvature and by an amount sufficient to equalize the load contact areas on the rings; substantially as described.

10. In an angular contact bearing, an inner race ring, an outer race ring, the rings having raceways curved transversely and one raceway constituting the zone of a sphere, each raceway having its center of curvature in the plane of the end face of its race ring, and transversely curved rollers engaging the raceways and having their axes at an angle to the bearing axis; substantially as described.

11. In an angular contact bearing, an inner race ring, an outer race ring, the rings having raceways curved transversely without interruption across the bearing and one raceway constituting the zone of a sphere, transversely curved rollers engaging the raceways and having their axes at an angle to the bearing axis, and the rollers conforming more closely to the curvature of the inner raceway than to the outer raceway; substantially as described.

12. In an angular contact bearing, an inner race ring, an outer race ring, the rings having raceways arcuately curved transversely and one of them being the zone of a sphere, transversely curved rollers engaging the raceways and conforming more closely to the inner raceway than to the outer raceway, and the centers of transverse curvature of inner raceway, outer raceway and rollers all being on the same line which extends through the center of the rollers at an angle to the bearing axis; substantially as described.

HAROLD R. GIBBONS.